United States Patent
Zorabedian

[19]

[11] Patent Number: 6,157,458

[45] Date of Patent: *Dec. 5, 2000

[54] ACHROMATIC QUARTER WAVE PLATE FOR AN AIR TURBULENCE COMPENSATING INTEFEROMETER

[75] Inventor: Paul Zorabedian, Mt. View, Calif.

[73] Assignee: Agilent Technologies, Palo Alto, Calif.

[*] Notice: This patent issued on a continued prosecution application filed under 37 CFR 1.53(d), and is subject to the twenty year patent term provisions of 35 U.S.C. 154(a)(2).

[21] Appl. No.: 09/070,473

[22] Filed: Apr. 30, 1998

[51] Int. Cl.$^7$ ........................................... G01B 9/02
[52] U.S. Cl. ............................................. 356/487; 356/517
[58] Field of Search ............................. 356/349, 351, 356/358, 361

[56] References Cited

U.S. PATENT DOCUMENTS

| | | | |
|---|---|---|---|
| 5,321,502 | 6/1994 | Matsumoto et al. | 356/351 |
| 5,404,222 | 4/1995 | Lis | 356/351 |
| 5,748,313 | 5/1998 | Zorabedian | 356/349 |
| 5,838,485 | 11/1998 | De Groot | 356/361 |

FOREIGN PATENT DOCUMENTS 0010201  1/1990  Japan ..................................... 356/358

OTHER PUBLICATIONS

Spindler & Hoyer catalog, pp. S15–S18, Jul. 1988.

Ealing Electro–Optics catalog, pp. K71–K72, Jul. 1991.

*Primary Examiner*—Samuel A. Turner

[57] ABSTRACT

An improved interferometric system with reduced air turbulence error. The system includes an optical retarder that functions as a quarter wave plate for two harmonically related frequencies. The retarder may be formed by a pair of quartz disks cut so that the C axis lie in the plane of the disk and are oriented orthogonally relative to each other.

6 Claims, 2 Drawing Sheets

ACHROMATIC QUARTER WAVE PLATE FOR AN AIR TURBULENCE COMPENSATING INTEFEROMETER

FIELD OF USE

The invention relates to laser interferometers, in particular to distance measuring interferometers.

BACKGROUND

Lasers are used in measurement systems for the precise measuring associated with manufacturing processes. Precision distance measuring is critical to processes such as integrated circuit (IC) fabrication. With increased laser accuracy and precision, finer IC line widths can be used, resulting in higher circuit density for greater performance. Additionally, laser system precision increases accuracy in aligning multiple layers on ICs, resulting in higher yield.

A laser system has the benefit of repeatability, that is to say, the ability to repeat a precise measurement exactly. This benefit has been extremely important to the disk drive industry. Lasers allow for higher track density for greater data storage capacity, and also provide higher yields and greater throughput.

Machine tools and other precision cutting machines use laser transducers to produce more accurate parts with smoother surface finishes.

Typically in a laser measurement system, a quarter wave plate is used to change the polarization of the measurement beam in order that the beam makes two passes at the measurement mirror. During the passes, error may be introduced by air turbulence.

Air turbulence affects the performance of distance measuring interferometers such as He—Ne lasers in applications such as IC steppers or scan lithography systems. Typical length measurement error range between ten and thirty (10–30) nanometers over a twenty (20) centimeter path. This measurement error results in stage positioning errors which affect the achievable overlay accuracy. By using the dispersive characteristics of air, measurements of the optical path length at multiple wavelengths can provide the information required to remove the effects of air turbulence on the measured path length. The small optical path length difference at the two wavelengths is directly proportional to the integrated air density measurement path.

Air turbulence correction via two independent distance measurements (using DC interferometry) has been described by Matsumoto, et. al. (Appli. Optics, v.31 pp 4522–26, 1992) using a single frequency HeNe laser and a Nd:YAG laser. However, accuracy in this method is hampered by fringe counting error; and the requirement for and attendant expense of two lasers makes this solution prohibitively expensive.

To implement this method, the ratio of the two measurement wavelengths must be known exactly. The use of a fundamental wave and its second harmonic satisfies this requirement. What is wanted is a single laser source generating two overlapping beams at two harmonically-related wavelengths, both beams characterized with a high degree of accuracy. Further needed is air turbulence error correction. Ideally, such air turbulence error correction would be without the addition of bulk to the system or expense to the manufacture of the interferometer.

What is needed is a interferometer system that reduces error from air turbulence without significant additional bulk or cost.

BRIEF SUMMARY OF THE INVENTION

What is taught is an interferometer system that reduces error from air turbulence in distance measurement without significant addition of bulk or manufacturing cost. The inventive system provides for measurement beams at two harmonically-related optical frequencies, f and 2f, along the same measurement path. The inventive system further provides for an optical retarder that is a quarter wave plate at both f and 2f. In the preferred embodiment, the optical retarder is formed by two quartz disks, each cut so that the C axes lie in the planes of the disks, and are oriented orthogonally relative to each other.

DETAILED DESCRIPTION OF THE DRAWINGS

Figure 2:
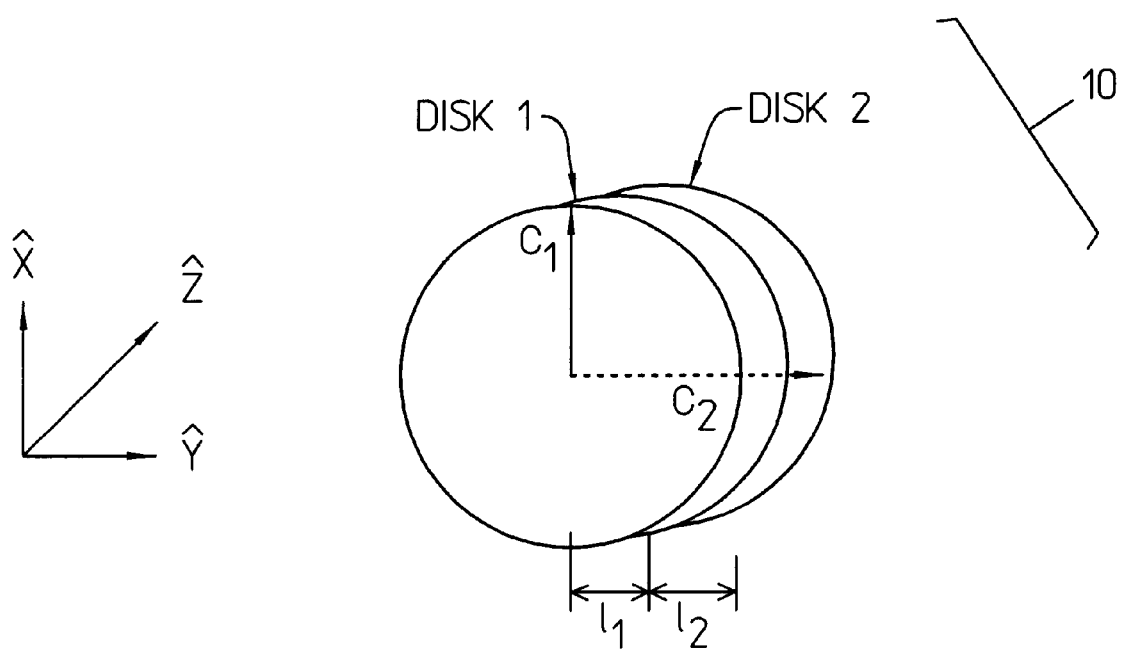
FIG. 2 depicts an example of an optical retarder suitable for use in an interferometer as depicted in FIG. 1.

Referring to FIG. 2

The retarder 10 is made by cementing or otherwise closely coupling two quartz disk. Each disk is cut so that a C axis lies in the plane of the disk. The relative orientation is made such that the two C axis are orthogonal as represented in FIG. 2.

The optical retarder depicted in FIG. 2 creates an interferometer system that reduces error from air turbulence in distance measurement without significant addition of bulk or manufacturing cost. The resulting inventive system provides for measurement beams at two widely separated optical frequencies, f and 2f, along the same measurement path. The inventive system further provides for an optical retarder that is a quarter wave plate at both f and 2f. In the preferred embodiment, the optical retarder is formed by two quartz disks cut so that the C axis lie in the plane of the disk, and are oriented orthogonally relative to each other.

Figure 1A:
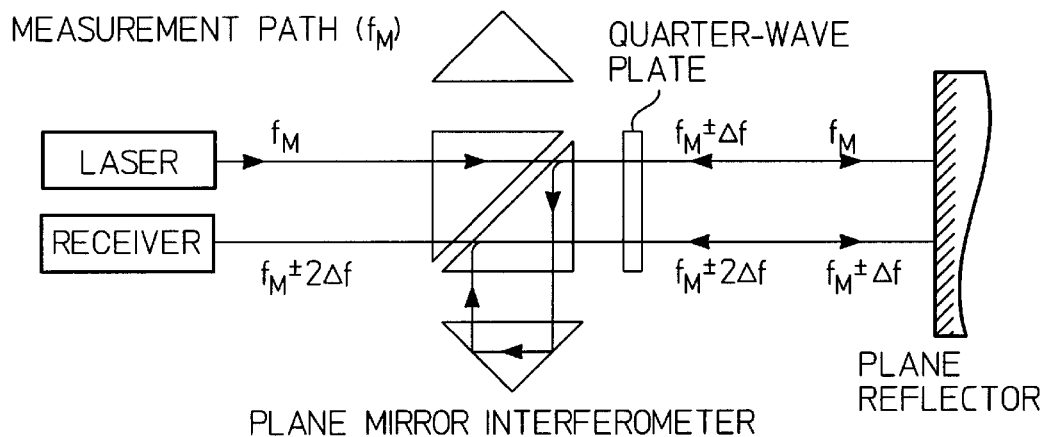
FIG. 1 illustrates a conventional interferometer.
Figure 1B:
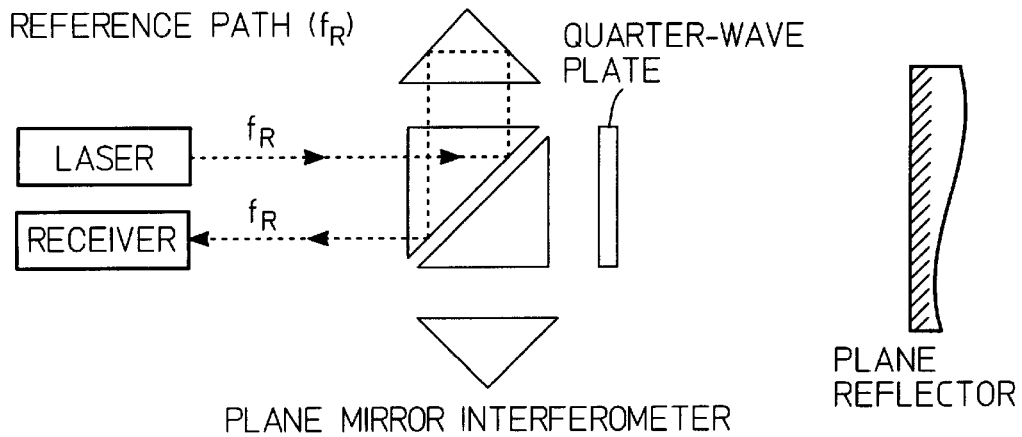
Figure 1C:
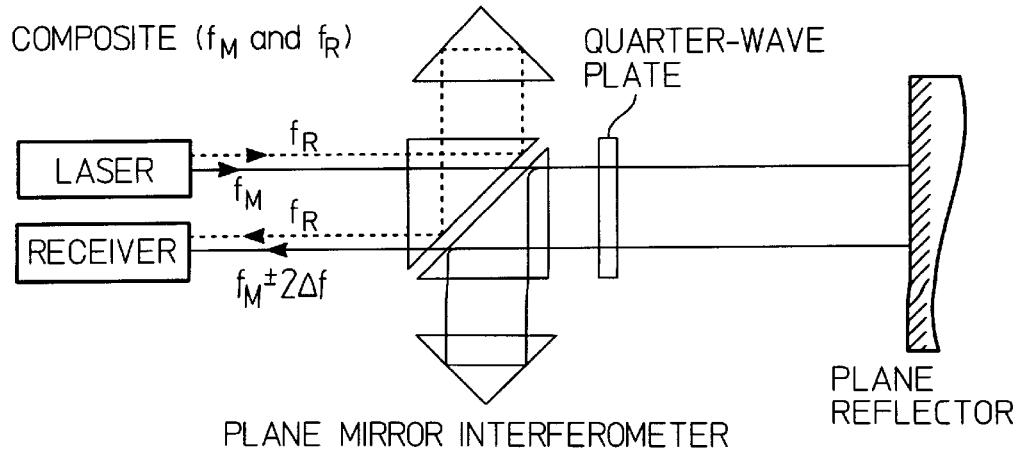

The optical retarder is positioned at a location at a location "A" as indicated in FIG. 1. Normally a quarter wave plate at wavelength lambda would be expected to function as a half nave plate at wavelength lambda/2. This is evident when considering the fundamental characteristics of birefringence. To be effective, the air-turbulence error correction algorithm requires that the difference between the index of refraction for the frequencies is as large as possible.

It is also required that the ratio of the wavelengths be known with a high degree of accuracy. To this end, it is desirable to use the second harmonic of a wavelength, thereby ensuring that the ratio between the two wavelengths is known with a high degree of precision.

Index of refraction varies with the wavelength of the light, a well-known effect called dispersion. An interferometer system measures optical path length, which is the product of the distance and the index of refraction. By using two different wavelengths related in a precisely known ratio, with a certain minimum difference in the index of refraction, $n_1$ different than $n_2$, the two equations may be solved for two unknowns. Therefore, attention must be paid to the proper selection of the light wavelengths used, as well as the waveplate used to ensure that it functions as a quarter wave retarder for both beams. If the retardation of the waveplate differs from a quarter wave, it will introduce undesirable nonlinearity errors into the distance measurement.

The retardation of this device may be described as the difference between the phase shifts for light polarized parallel to $\hat{x}$ and $\hat{y}$ $$1. \Delta o = \phi_x - \phi_y = [n_e l_1 + n_o l_1 - n_o l_2 - n_e l_2] \cdot \frac{2\pi}{\lambda}$$

where $n_e$ and $n_o$ are, respectively, the extraordinary and the ordinary indices of refraction for the retarder material, typically quartz, and $l_1$ and, respectively, for the thicknesses of disk 1 and disk 2.

Thus, we have $$2. \Delta\phi = \Delta n \cdot \Delta l \cdot \frac{2\pi}{\lambda}$$

where $$\Delta n = n_e - n_o \quad \Delta l = l_1 - l_2$$

For the retarder to function as a quarter wave plate, $\Delta\phi$ must satisfy the condition $$3. \Delta\phi = M \cdot \frac{\pi}{2}$$

for some odd integer M.

Further requiring that the retarder function as a quarter wave plate at two different wavelengths $\lambda_a$ and $\lambda_b$ there must exist two odd integers $M_a$ and $M_b$ such that:

$$4. \Delta n(\lambda_a) \cdot \Delta l \cdot \frac{2\pi}{\lambda_a} = M_a \cdot \frac{\pi}{2}$$

$$5. \Delta n(\lambda_b) \cdot \Delta l \cdot \frac{2\pi}{\lambda_b} = M_b \cdot \frac{\pi}{2}$$

For air turbulence compensation, we are interested in wavelengths that are typically generated by diode pumped YAG lasers and for which the refractive indices of quartz are precisely known. In the preferred embodiment, the wavelengths are as follows:

| λnm | $n_e$ | $n_o$ |
|---|---|---|
| 532 | 1.555996 | 1.546799 |
| 1064 | 1.54260 | 1.53387 |

Solving the division of Eq 4 by equation 5, we obtain $$\frac{M_b}{M_a} = 2 \cdot 1.0535 = 2.1070 \quad \text{(Eq 6)}$$

Two odd integers that closely approximate a solution to equation 6 are $$M_a = 9 \text{ and } M_b = 19 \quad \left(\frac{19}{9} = 2.111\right)$$

Since these integer values do not satisfy Eq 5 exactly, to minimize retardation error at both wavelengths, compute $\Delta l$ from Equation 4 at wavelenghts $\lambda_a$ and $\lambda_b$ and take the average $$\Delta l_a = \frac{M_a}{\Delta n(\lambda_a)} \frac{\lambda_a}{4} = \frac{9}{.00873} \cdot \frac{1064 \times 10^{-9}\text{m}}{4} = .2742\text{mm} \quad \text{Eq 8}$$

$$\Delta l_b = \frac{M_b}{\Delta n(\lambda_b)} \frac{\lambda_b}{4} = \frac{19}{.009197} \cdot \frac{532 \times 10^{-9}\text{m}}{4} = .2748\text{mm} \quad \text{Eq 9}$$

$$\Delta l_{avg} = 0.2746 \text{ mm} \quad \text{Eq 10}$$

For the He Ne interferometer, the industry-standard Hewlett-Packard interferometer system the retardation specification for the quarter wave plate is $$\Delta\phi \cdot \frac{\lambda}{2X} \frac{\lambda}{4} \pm \frac{\lambda}{200} \quad (\text{i.e. } 90° \pm 1.8°).$$

$$\Delta\phi 9 \cdot \frac{\lambda_a}{2\Gamma} = \left| 9 \cdot \frac{1064 \times 10}{4} - .00873 \cdot .2746 \times 10^{-3} \right| =$$

$$3.258 \times 10^{-9} < \frac{\lambda a}{200} = 5.32 \times 10^{-9}$$

$$\Delta\phi_b \cdot \frac{\lambda_b}{2\pi} = \left| 19 \cdot \frac{532 \times 10^{-9}}{4} - .009197 \cdot .2746 \times 10^{-3} \right| =$$

$$1.504 \times 10^{-9} < \frac{\lambda b}{200} = 2.66 \times 10^{-9}$$

Thus, it can be seen that the retarder satisfies the specification at both wavelengths for the nominal disk thickness difference of 0.2746 nm.

The temperature stability of the optical retarder must also be considered. It is important that the optical retarder remains within performance specifications when accounting for thermal expansion of the retarder material, typically quartz. Consider operation at 532 nm. The refractive index temperature coefficients are:

$$\frac{dn_e}{dT} = -0.65 \times \frac{10^{-5}}{°\text{C.}} \text{ and } \frac{dn_o}{dT} = -0.55 \times \frac{10^{-5}}{°\text{C.}} \text{ (at 640 } nw\text{)}$$

$$\text{Therefore } \frac{d\Delta n}{dT} = -0.05 \times \frac{10^{-5}}{°\text{C.}}$$

Thermal expansion coefficient in the thickness direction, perpendicular to the C axis, is $$13.37 \times \frac{10^{-6}}{°\text{C.}} = C_T$$

Letting $T_o$ be the center of the range and $T_u$ being the upper limit, $T_1$ the lower limit, $$\Delta n(T_o)\Delta l(T_o) + \Delta l(T_o)\frac{d\Delta n}{dT}(T_u - T_o) + \Delta n(T_o)\frac{d\Delta l}{dT}(T_u - T_o) = \quad \text{Eq. 11}$$

$$19 \cdot \frac{\lambda}{4} - \frac{\lambda}{200}$$

$$\Delta n(T_o)\Delta l(T_o) + \Delta l(T_o)\frac{d\Delta n}{dT}(T_L - T_o) + \Delta n(T_o)\frac{d\Delta l}{dT}(T_L - T_o) = \quad \text{Eq. 12}$$

$$19 \cdot \frac{\lambda}{4} - \frac{\lambda}{200}$$

Subtracting Eq 12 from Eg 11 to get range:

$$\left(\Delta l(T_o)\frac{d\Delta n}{dT} + \Delta n(T_o)\frac{d\Delta l}{dT}\right)(T_u - T_L) = -\frac{\lambda}{100}$$

$$\Delta T = \frac{\lambda}{100}\frac{1}{\Delta l\frac{d\Delta n}{dT} + \Delta n \cdot \Delta l \cdot C_T} =$$

$$\frac{532 \times 10^{-9}}{.100} \cdot \frac{1}{.2746 \times 10^{-3} \cdot (-5 \times 10^{-7}) + (.009197) \cdot (2746 \times 10}$$

The temperature range computed from Eq 12 is $$\Delta T = 25.7° \text{ C.}$$

The temperature coefficient of the birefringence of quartz is known to be wavelength dependent. It may be assumed for the sake of this application that the temperature range from 1064 nm retardation will be approximately equal to that for 532 nm.

ALTERNATE EMBODIMENTS

It is worth noting that the optical retarder need not be made from two disks or plates closely coupled. It is theoretically possible to use a single plate of thickness equal to $\Delta l$. However, for the orders of $M_a=9$ and $M_b=19$, the single plate which would satisfy the conditions would be only ¼ mm thick, too thin to be conveniently handled or manufactured. By choosing higher order numbers, say $M_a=27$ and $M_b=57$, we compute the thickness as follows:

$$\Delta l_{avg} = \frac{1}{2}\left\{\frac{57}{.009197} \cdot \frac{532 \times 10^{-9}}{4} + \frac{27}{.00873} \cdot \frac{1064 \times 10^{-9}}{4}\right\} = .8235 \text{ mm}$$

However, it is also necessary that the single disk meet the retardation specification at $$\frac{\lambda}{4} + \frac{\lambda}{200}$$

the preferred wavelengths. Where the wavelengths are 532 and 1064 nm, the equations yield:

$$\Delta\phi_{1064} \cdot \frac{1064 - 10^{-9}}{27_l} = \left|27 \cdot \frac{1064 \times 10^{-9}}{4} - (.00873) \cdot (.3235) \times 10^{-3}\right| =$$

$$7.16 \times 10^{-9}\bigg/\frac{1064 \times 10^{-9}}{200} = 5.32 \times 10^{-9}$$

$$\Delta\phi_{532} \cdot \frac{532 - 10^{-9}}{2\pi} = \left|57 \cdot \frac{532 \times 10^{-9}}{4} - (.009197) \cdot (.8235) \times 10^{-3}\right| =$$

$$7.27 \times 10^{-9}\bigg/\frac{532 \times 10^{-9}}{200} = 2.66 \times 10^{-9}$$

Therefore, a single disk or plate retarder which is easy to handle or manufacture does not necessarily meet the specification. Conversely, one that meets the specification may be too thin to handle. These and other considerations are to be considered by the person of average skill in the art when designing an interferometric system according to the invention taught herein.

What is claimed is:

1. An improved heterodyne laser interferometric system wherein said system includes a pair of optical waves at a frequency f and a frequency 2f, the frequency 2f being substantially twice the frequency of the frequency f, said improvement comprising:

an optical wave retarder operable to retard each said wave of the pair of waves by approximately a quarter wave with an error in said retarding of substantially not more than 1.8 degrees.

2. The improved system as in claim 1, wherein the optical wave retarder includes a pair of optical disks, each disk having a C axis in the plane of the disk, and the pair of disks closely coupled and oriented so that the C axis of one disk is orthogonal to the C axis of the other disk.

3. The improved system as in claim 2, wherein the difference in the thickness between the two disks included in the wave retarder is preselected so that the phase shifts for the optical beams may be described:

$$\Delta\phi = \phi_x - \phi_y = [n_e l_1 + n_o l_1 - n_o l_2 - n_e l_2] \cdot 2\pi/\lambda$$

where [ne] $n_e$ is the extraordinary index of refraction $n_o$ is the ordinary index of refraction $l_1$ is the thickness of disk 1

$l_2$ is the thickness of disk 2.

4. The improved system as in claim 3 further described by the optical retarder satisfying a condition where M is some odd integer, and $$\Delta\phi = M \cdot 2\pi/\lambda.$$

5. The improved system as in claim 4, wherein the optical retarder operates as a quarter wave retarder on both optical waves by preselecting the ratio of the disk thicknesses to be a whole number.

6. The improved system as in claim 1, wherein the optical wave retarder is a single optical disk operable to retard each of the pair of waves by approximately a quarter wave.

* * * * *